(12) United States Patent
Hsieh

(10) Patent No.: US 8,653,013 B2
(45) Date of Patent: Feb. 18, 2014

(54) NONTOXIC LOW MELTING POINT FUSIBLE ALLOY LUBRICATION OF ELECTROMAGNETIC RAILGUN ARMATURES AND RAILS

(75) Inventor: Peter Yaw-Ming Hsieh, Cerritos, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 168 days.

(21) Appl. No.: 13/317,041

(22) Filed: Sep. 20, 2011

(65) Prior Publication Data

US 2013/0333678 A1    Dec. 19, 2013

(51) Int. Cl.
*C10M 103/00*     (2006.01)
*C10M 125/00*     (2006.01)

(52) U.S. Cl.
CPC .......... *C10M 103/00* (2013.01); *C10M 125/00* (2013.01)
USPC .......................................... 508/103; 508/150

(58) Field of Classification Search
CPC . C10M 103/00; C10M 113/00; C10M 125/00
USPC .................. 508/154, 165, 103, 123, 127, 150
See application file for complete search history.

(56) References Cited

U.S. PATENT DOCUMENTS

| | | | |
|---|---|---|---|
| 452,030 A | 5/1891 | Castner | |
| 2,649,368 A | 8/1953 | Smith et al. | 75/134 |
| 3,427,244 A * | 2/1969 | Boes | 75/230 |
| 4,214,903 A | 7/1980 | Murabayashi et al. | 75/134 |
| 4,753,858 A | 6/1988 | Jow | 429/217 |
| 5,168,020 A | 12/1992 | Jow | 429/217 |
| 5,385,683 A * | 1/1995 | Ransom | 508/181 |
| 5,478,978 A | 12/1995 | Taylor et al. | 200/233 |
| 5,792,236 A | 8/1998 | Taylor et al. | 75/715 |
| 6,019,509 A | 2/2000 | Speckbrock et al. | 374/201 |
| 2004/0180796 A1* | 9/2004 | Iwata et al. | 508/103 |
| 2005/0197259 A1* | 9/2005 | Levy | 508/168 |
| 2007/0215253 A1* | 9/2007 | Dasch et al. | 148/577 |
| 2011/0142384 A1* | 6/2011 | Hofmann | 384/42 |

OTHER PUBLICATIONS

P. Surmann at al.,"Voltammetric analysis using a self-renewable non-mercury electrode", *Anal. Bioanal. Chem.* (2005) 3R3: 1009-1013.

* cited by examiner

*Primary Examiner* — Stephen M Johnson
(74) *Attorney, Agent, or Firm* — Gerhard W. Thielman, Esq.

(57) ABSTRACT

A railgun which has a conductive lubricant and system of delivery reduces the electrical resistance and friction of the armature-rail sliding contact, thereby decreasing the amount of heat generated at the electrical contact. The conductive lubricant may be a ternary alloy of bismuth, indium and tin. The system of delivery for the conductive lubricant may include a plurality of surface reservoirs formed in either the rail surface, the armature face, or both.

2 Claims, 1 Drawing Sheet

NONTOXIC LOW MELTING POINT FUSIBLE ALLOY LUBRICATION OF ELECTROMAGNETIC RAILGUN ARMATURES AND RAILS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The invention relates to railguns and, more particularly, railgun armatures having a conductive lubricant and system of delivery which reduces the electrical resistance and friction of the armature-rail contact, thereby reducing the amount of heat generated at the armature-rail sliding electrical contact.

(2) Description of the Prior Art

A railgun is an entirely electrical gun that accelerates a conductive armature along a pair of rails to launch a projectile. A typical railgun includes at least one pair of oppositely spaced, generally parallel electrically conducting rails. The breech ends of the rails are connected to a pulsed-power current source, typically a bank of capacitors or a large homopolar generator. A projectile is placed between the rails. When the current pulse is applied to the rails, the conductive armature completes the current path between the rails and accelerates the projectile. Particular characteristics of a railgun are the lack of propellant (only the projectile, armature and the electrical energy to launch it are required to be expended) and the ability to launch projectiles much faster than chemical propellant-based technology allows.

Railguns are being researched as weapons with projectiles that do not contain explosives, but are given extremely high velocities—about 3,500 m/s or more, making the railgun's kinetic energy equal or superior to the energy yield of an explosive-filled shell of greater mass. This would allow more ammunition to be carried and eliminate the hazards of carrying explosives in a ground vehicle or naval vessel. Also, by firing at greater velocities, railguns have greater range, less bullet drop and less wind drift, bypassing the inherent cost and physical limitations of conventional guns.

Intense heating of the armature-rail sliding contact due to electrical resistance and friction damages the rails in electromagnetic railguns and limits their service life.

Solid railgun armatures are fabricated from aluminum alloys due to their low density and melting point. Melting of the aluminum armature at the armature-rail contact is thought to produce a thin liquid metal layer, which is observed on the rails as a transfer film. The hot liquid aluminum is metallurgically reactive and forms brittle intermetallic compounds at the rail surface, which may lead to runaway heating and transition to a plasma state at the contact. The high temperature plasma is damaging to rails and insulators in a railgun. Moreover, the liquid aluminum forms small droplets which burn violently in contact with air. The burning droplets form aerosolized aluminum oxide particles which may pose a respiratory hazard.

Georgia Tech undertook a study of liquid gallium as a railgun lubricant at the same time Northwestern University, working with the University of Texas at Austin, investigated bismuth, tin and indium as low melting point solid lubricants. Liquid gallium and mercury are known to embrittle high performance alloys at room temperature, and require protective coatings to prevent catastrophic failure of the armature during launch (due to the loss of ductility). Moreover, gallium is mildly corrosive and requires personal protective equipment in handling. The bismuth, tin and indium elements and binary alloys of these elements studied at Northwestern University are nontoxic and do not embrittle aluminum in their solid form. However, it is necessary to melt the elements and their binary alloys to permit casting into armature reservoirs. This is a difficult operation when one side of the armature is already filled, since the armature temperature must not exceed the melting point of the element or alloy. Channels and large rectangular surface reservoirs were tested on a small-caliber electromagnetic launcher at the University of Texas at Austin's Institute for Advanced Technology.

More recently, the Naval Research Laboratory tested mercury as a liquid railgun lubricant. Due to the acute and chronic toxicity of mercury and its chemical compounds, it is unsuitable for use where personnel may be exposed to lubricant residues.

There is a need for a conductive lubricant and system of delivery which reduces the electrical resistance and friction of the armature-rail contact.

SUMMARY OF THE INVENTION

According to one aspect of the current invention, a railgun comprises a pair of rails adapted to be electrically charged; a conductive armature disposed between the pair of rails; a surface pattern disposed on at least one of a surface of the pair of rails and a surface of the conductive armature; and an alloy lubricant disposed on the surface pattern, wherein the alloy lubricant is a ternary alloy of bismuth, indium and tin.

According to another aspect of the current invention, a ternary alloy comprising bismuth, indium and tin used as a lubricant.

According to a further aspect of the current invention, a method for lubricating a contact between a first metal and a second metal comprises disposing a surface pattern on at least one of the first metal and the second metal; and disposing a ternary lubricating alloy on the surface pattern, wherein the alloy lubricant is a ternary alloy of bismuth, indium and tin.

The above and other features of the invention, including various novel details of construction and combinations of parts, will now be more particularly described with reference to the accompanying drawings and pointed out in the claims. It will be understood that the particular assembly embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent, wherein corresponding reference characters indicate corresponding parts throughout the several views of the drawings and wherein.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention: the scope of the invention is best defined by the appended claims.

Bismuth, tin and indium forms an eutectic alloy, with a composition of 32.5% bismuth, 51.0% indium, and 16.5% tin (by mass), which melts at 60.5° C. The constituent elements are nontoxic and the alloy should not embrittle engineering alloys in its solid form. The alloy may be prepared by melting commercially pure bismuth, indium and tin in an oven or furnace at about 300° C. for one hour. Heating under vacuum or an inert gas atmosphere will help to reduce the quantity of dross formed at the surface of the crucible, but any dross present may be skimmed off during pouring and casting.

The lubricant alloy may be introduced into the armature-rail contact via burnishing or via textured surface reservoirs. For purposes of this disclosure, the term surface pattern in context of the reservoirs resulting from textural indentations (i.e., texture) can be produced, for example, by ball-milling the armature and rail surfaces.

The low melting point bismuth-indium-tin ternary alloy of the current invention may keep the sliding contact temperature sufficiently low to prevent the aluminum armature from melting and to form a renewable boundary lubricant film over the rail surface. The bismuth-indium-tin eutectic alloy is nontoxic, where mercury is toxic and gallium is mildly corrosive. Moreover, both mercury and gallium are known to cause liquid metal embrittlement of aluminum and its alloys. The ternary alloy of the current invention melts at an even lower temperature than its constituent elements and binary alloys thereof. The lower melting point makes it easier to handle, requiring less heating and fewer personal protective equipment in fabrication. The ternary bismuth-indium-tin eutectic alloy is soft, allowing it to act as a solid lubricant, reducing the friction encountered during loading of the armature. The alloy may also increase the effective contact area, reducing the initial electrical contact resistance.

The melting point and resistivity of the ternary bismuth-indium-tin alloy may be adjusted by changing the quantity of bismuth, indium and tin used during initial fabrication. For example, an alloy may be formed from about 10-60% bismuth, about 20-80% indium, and about 5-50% tin (by mass). Other compositions may be contemplated within the scope of the current invention as defined by the appended claims.

Figure 1:
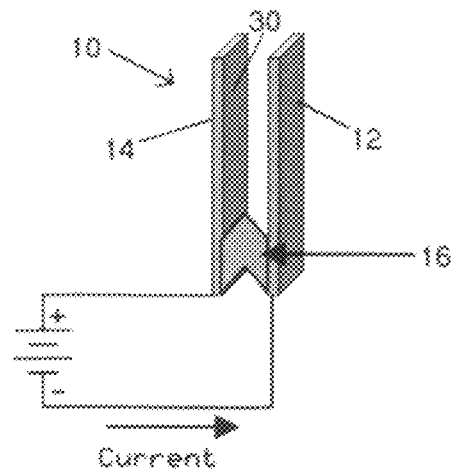
FIG. 1 is a perspective schematic view of a railgun.

Referring to FIG. 1, a typical railgun 10 may include parallel metallic rails 12, 14. A projectile 16 may be disposed between the rails 12, 14. Application of a voltage between the rails 12, 14 causes a large current to flow through the rail 12, through the projectile 16, and thence through the rail 14. Interaction between the aforementioned current and its self-generated magnetic field produces a Lorentz force which accelerates the projectile 16 between the rails 12, 14 in a direction away from the points of application of the voltage.

Figure 2:
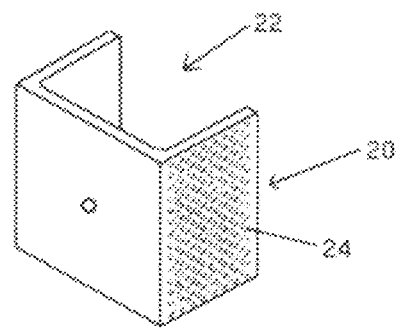
FIG. 2 is a perspective view of an armature face of a railgun having a surface reservoir pattern according to an exemplary embodiment of the current invention.
Figure 3:
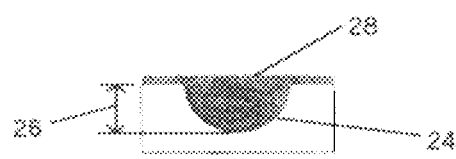
FIG. 3 is a close-up cross-sectional view showing the geometry of the surface reservoir pattern shown in of FIG. 2.

Referring to FIGS. 2 and 3, a sample surface reservoir pattern 20 for an armature 22 is shown with each dimple 24 formed, for example, via ball milling of the armature face to a depth 26 less than the diameter of the ball for a hemispherical cross-section geometry. The lubricant alloy 28 may be introduced into each dimple 24 in liquid form or cold-sprayed into the dimple 24 at high velocity in solid form. Reservoirs patterns 20 may be employed on the face of the armature 22, a rail surface 30 (see FIG. 1), or both. As a general principle, the volume of lubricant employed should be minimized by careful design of the reservoir pattern and geometry for the best effect.

Typically, surface patterns, in the form of dimples, may be used for the introduction of lubricant alloy into the armature. In some embodiments, slots and large rectangles may be cut into the armature and rail face to contain the lubricant alloy. By using surface patterning, in the form of dimples, however, boundary or elasto-hydrodynamic lubrication is attained with a minimal amount of lubrication, avoiding the increased viscous loss present in hydrodynamic lubrication.

While the above description focuses on the alloy lubricant and system of delivery for use in railguns, the current invention may be applied to other systems. For example, the current invention may have potential application wherever a self-lubricating, conductive, moving metal to metal contact is needed.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is neither intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:
1. A lubricating ternary alloy consisting essentially of:
bismuth 32.5% by mass;
indium 51.0% by mass; and
tin 16.5% by mass.
2. The lubricating ternary alloy of claim 1, wherein the lubricating ternary alloy is nontoxic.

* * * * *